(12) United States Patent
Hu et al.

(10) Patent No.: US 12,488,292 B2
(45) Date of Patent: Dec. 2, 2025

(54) STAR RATING MANAGEMENT METHOD AND SYSTEM FOR DEPLOYMENT AND IMPLEMENTATION OF GAS FIELD DEVELOPMENT WELLS

(71) Applicant: Exploration & Production Research Institute of SINOPEC North-China Oil & Gas Company, Zhengzhou (CN)

(72) Inventors: Bo Hu, Zhengzhou (CN); Xiaobo Liu, Dongying (CN); Yongyi Zhou, Zhengzhou (CN); Yongming He, Chengdu (CN); Linsong Liu, Zhengzhou (CN); Kui Chen, Zhengzhou (CN); Tongsheng Cao, Zhengzhou (CN); Yaonan Yu, Zhengzhou (CN); Yan Chen, Zhengzhou (CN)

(73) Assignee: Exploration & Production Research Institute of SINOPEC North-China OIL & Gas company, Zhengzhou (CN)

( * ) Notice: Subject to any disclaimer, the term of this patent is extended or adjusted under 35 U.S.C. 154(b) by 284 days.

(21) Appl. No.: 18/126,484

(22) Filed: Mar. 27, 2023

(65) Prior Publication Data

US 2023/0229981 A1    Jul. 20, 2023

(51) Int. Cl.
*G06Q 10/10*   (2023.01)
*G06Q 10/04*   (2023.01)
(Continued)

(52) U.S. Cl.
CPC ........... *G06Q 10/04* (2013.01); *G06Q 10/103* (2013.01); *G06Q 40/06* (2013.01)

(58) Field of Classification Search
CPC ...... G06Q 10/04; G06Q 10/103; G06Q 40/06; G06Q 10/06; G06Q 10/06315; G06Q 10/06375; G06Q 50/02; G06Q 50/06
(Continued)

(56) References Cited

U.S. PATENT DOCUMENTS 6,612,382 B2 * 9/2003 King ..................... E21B 44/005
702/9
7,111,681 B2 * 9/2006 Detournay ............. E21B 49/00
166/308.1
(Continued)

OTHER PUBLICATIONS

Popescu, Catalin, and Sorin Alexandru Gheorghiu, "Economic Analysis and Generic Algorithm for Optimizing the Investments Decision-Making Process in Oil Field Development" Energies 14, No. 19: 6119, Sep. 26, 2021 (Year: 2021).*
(Continued)

*Primary Examiner* — Jonathan P Ouellette

(57) ABSTRACT

A star rating management method for deployment and implementation of gas field development wells first establishes the expression for estimating the gas well initial production rate and the dimensionless production curve; then determines the annual production of the new well for every year during the evaluation period and determines the internal rate of return of the new gas well. If the internal rate of return fails to meet the requirement, the deployment location and construction technology of the new well are re-optimized. Corresponding stars rating are determined according to the internal rate of return of the gas wells. The new well is drilled according to the deployment location that can meet the economic benefit requirements. After the gas well is drilled, a more detailed fracturing design is carried out, and the internal rate of return of the gas well and the star rating of development benefit are redetermined.

6 Claims, 2 Drawing Sheets

(51) Int. Cl.
*G06Q 10/06* (2023.01)
*G06Q 30/02* (2023.01)
*G06Q 30/06* (2023.01)
*G06Q 40/06* (2012.01)

(58) Field of Classification Search
USPC .................................................. 705/1.1–912
See application file for complete search history.

(56) References Cited

U.S. PATENT DOCUMENTS

| | | | |
|---|---|---|---|
| 8,620,715 B2* | 12/2013 | Guyaguler | G01V 11/00 705/7.22 |
| 9,222,337 B2* | 12/2015 | Bunger | E21B 41/00 |
| 9,710,766 B2* | 7/2017 | Saleri | G01V 1/50 |
| 9,767,421 B2* | 9/2017 | Saleri | G06Q 10/06 |
| 9,910,938 B2* | 3/2018 | Morales German | G01V 20/00 |
| 10,147,204 B2* | 12/2018 | Pratt | G06T 11/001 |
| 10,915,847 B1* | 2/2021 | Saleri | G06Q 10/06315 |
| 11,313,211 B2* | 4/2022 | Johnson | E21B 47/06 |
| 2005/0149307 A1* | 7/2005 | Gurpinar | E21B 43/00 703/10 |
| 2008/0052097 A1* | 2/2008 | Bouzas | G06Q 50/06 705/1.1 |
| 2011/0153300 A1* | 6/2011 | Holl | E21B 41/00 703/10 |
| 2013/0246032 A1* | 9/2013 | El-Bakry | G06F 30/20 703/10 |
| 2015/0331971 A1* | 11/2015 | Scollard | G01V 20/00 703/1 |
| 2024/0141781 A1* | 5/2024 | Ates | E21B 43/16 |

OTHER PUBLICATIONS

Clarkson, "Production data analysis of unconventional gas wells: Workflow", International Journal of Coal Geology, vols. 109-110, pp. 147-157, Dec. 2012 ISSN 0166-5162, https://doi.org/10.1016/j.coal.2012.11.016. (Year: 2012).*

* cited by examiner

STAR RATING MANAGEMENT METHOD AND SYSTEM FOR DEPLOYMENT AND IMPLEMENTATION OF GAS FIELD DEVELOPMENT WELLS

BACKGROUND OF THE PRESENT INVENTION

Field of Invention

The present invention relates to a star rating management method and system for deployment and implementation of gas field development wells, belongs to a technical field of gas field development.

DESCRIPTION OF RELATED ARTS

Gas wells are the most basic management object for the efficient development of gas fields, and the development benefit of gas fields is based on the development benefit of each gas well. Therefore, establishing the development concept that "each well is a source of benefit" can help ensure the overall benefit of gas field development. The "star rating management" concept proposed by the present invention for the deployment and implementation of gas field development wells has not been disclosed by prior art, which fills a relevant gap in the field of fine gas well management.

SUMMARY OF THE PRESENT INVENTION

An object of the present invention is to provide a star rating management method and system for deployment and implementation of gas field development wells, so as to improve development effects of the gas field development wells.

Accordingly, in order to accomplish the above object, the present invention provides a star rating management method for deployment and implementation of gas field development wells, comprising steps of:

1) obtaining dynamic production data of previously implemented similar gas wells, and normalizing the dynamic production data to obtain a dimensionless production curve; forecasting change trend of the dimensionless production curve for extending a production time of the dimensionless production curve to an end of an evaluation period, so as to obtain a dimensionless production curve of the evaluation period;
2) establishing a relationship between initial production rate of gas well, and key geological characteristic parameters of gas formation as well as key fracturing parameters based on production and geological characteristics of similar gas wells implemented previously, and using the relationship as an expression for estimating the gas well initial production rate;
3) based on drilling depth, fracturing design and surface conditions of gas wells, estimating development investment cost required to achieve normal production of the gas wells, which comprises drilling and production costs; wherein the fracturing design comprises number of fractured layers, number of fractured segments, amount of sand added, amount of fracturing fluid, sand concentration and materials to be used in the gas wells;
4) based on key geological characteristics parameters and key fracturing design parameters of a new gas well, estimating initial production of the new gas well by using the expression for estimating the gas well initial production rate obtained in the step 2); and then predicting annual production of the new well during the evaluation period according to the dimensionless production curve obtained in the step 1);
5) based on the development investment cost of the new well obtained in the step 3), production forecast of the new well during the evaluation period obtained in the step 4), gas prices, as well as development and operating cost data of similar gas wells, calculating an internal rate of return of the new well with a cash flow method;
6) if the internal rate of return of the new gas well fails to meet economic benefit requirements, optimizing a deployment location as well as drilling and fracturing technology of the new gas well, and then repeating the steps 3)-5) until the internal rate of return of the new gas well meets the economic benefit requirements;
(7) after the internal rate of return meets the economic benefit requirements, drilling the new well at a corresponding deployment location, and then performing fracturing optimization again based on geological feature parameters obtained from actual drilling data; and
8) based on the reoptimized fracturing design, repeating the steps 3)-5) to redetermine the internal rate of return of the new gas well.

The present invention further provides a star rating management system for deployment and implementation of gas field development wells, comprising a processor and a memory, wherein the processor executes a computer program stored in the memory to implement the star rating management method for deployment and implementation of the gas field development wells as described in the present invention.

First, the present invention establishes the initial production rate expression of the gas well and the dimensionless production curve by using the dynamic production data of the previously implemented similar gas wells; then uses the above results to determine the annual production of the new well for every year during the evaluation period, and determines the internal rate of return of the new gas well based on production and costs with the cash flow method. If the internal rate of return fails to meet the economic benefit requirement, the deployment location and construction technology of the new well are re-optimized until the economic benefit requirements is satisfied. Corresponding star ratings are determined according to the internal rate of return of the gas wells. The new well is drilled according to the deployment location that can meet the economic benefit requirements. After the gas well is drilled, a more detailed fracturing design is carried out, and the internal rate of return of the gas well and the star rating of development benefit are redetermined according to the new design. Through the above process, the present invention can effectively improve the pertinence of single well geological design and fracturing construction design, thus improving the development effect and guaranteeing the development quality.

Preferably, for getting better construction results, the star rating management method further comprises a step of: during a fracturing implementation stage of the new gas well, timely optimizing and adjusting construction parameters such as the fracturing displacement, the sand concentration, the amount of sand added and amount of fracturing fluid according to actual construction conditions on site.

Preferably, the star rating management method further comprises a step of: redetermining the internal rate of return of the new gas well based on actual initial production rate of the new gas well after fracturing.

Preferably, for refined management, the star rating management method further comprises a step of: hierarchically evaluating development benefit of the gas wells according to the internal rate of return, wherein the internal rate of return is divided into a number of star ratings from small to large, and corresponding star ratings are determined according to the internal rate of return of the gas wells.

Preferably, to ensure the development benefit of the new gas well, the economic benefit requirements in the step 6) refers to a bottom limit of the internal rate of return for benefit development.

Preferably, starting points of internal rate of return for two adjacent star ratings differ by 2%.

Preferably, to forecast the gas well production rate during the evaluation period, in the step 1), an ARPS method is used for forecasting the change trend of the dimensionless production curve.

Preferably, in the step 1), the dimensionless production curve is determined as follows:

A: obtaining the dynamic production data of the previously implemented similar gas wells which are of a same type of the new gas well; using production start-up dates of each of the gas wells as starting points, using identical time measurement units, and providing production rates of the gas wells at different time points according to actual production data; using a shortest production time among the gas wells as a target cut-off time for normalization;

B: using average production of each of the gas wells at different time points as normalized gas well production at a corresponding time point; and C: dividing the normalized gas well production rate at different time points by normalized gas well initial production rate, so as to obtain the dimensionless production curve with the initial production rate as a comparison object.

Preferably, in the step 2), the expression for estimating the gas well initial production rate is:

$$Qsc = \sum_{i=1}^{Nsec} 0.1728 \times R_{di} \times L_{fi} \times H_{fi} \times \frac{k_i}{u_g} \left( \frac{P_r^2 - P_{wf}^2}{d_{fi}} - G_g \frac{P_r + P_{wf}}{2} \right) \frac{1}{\overline{Z}T} \times \frac{Z_{sc} \times T_{sc}}{P_{sc}}$$

$$H_{fi} = b \times Q_{pi}^d \times V_{si}^n$$

$$L_{fi} = c \times Q_{pi}^t \times V_{si}^w$$

wherein 0.1728 is a dimensional conversion factor, $Q_{sc}$ indicates an estimated gas well initial production rate in m³/d; Nsec indicates the fractured segment numbers, which is dimensionless; $R_{di}$ indicates a drilling encounter rate of a gas formation at an ith fracture segment, which is dimensionless; $L_{fi}$ indicates a length of an ith fracture in m; $H_{fi}$ indicates a height of the ith fracture in m; $k_i$ indicates a reservoir permeability at the ith fracture in mD; $u_g$ indicates gas viscosity in mPa·s; $P_r$ indicates a formation pressure in MPa; $P_{wf}$ indicates a bottomhole flow pressure in MPa; $G_g$ indicates a gas seepage resistance gradient in MPa/m; $d_{fi}$ indicates a spacing between the ith fracture and fractures on both sides in m; $Q_{pi}$ indicates a fracturing displacement at the ith fracture in m³/min; $V_{st}$ indicates a sand addition amount at the ith fracture in m³; b, c, d, n, t and w are fitting parameters.

DETAILED DESCRIPTION OF THE PREFERRED EMBODIMENT

Figure 1:
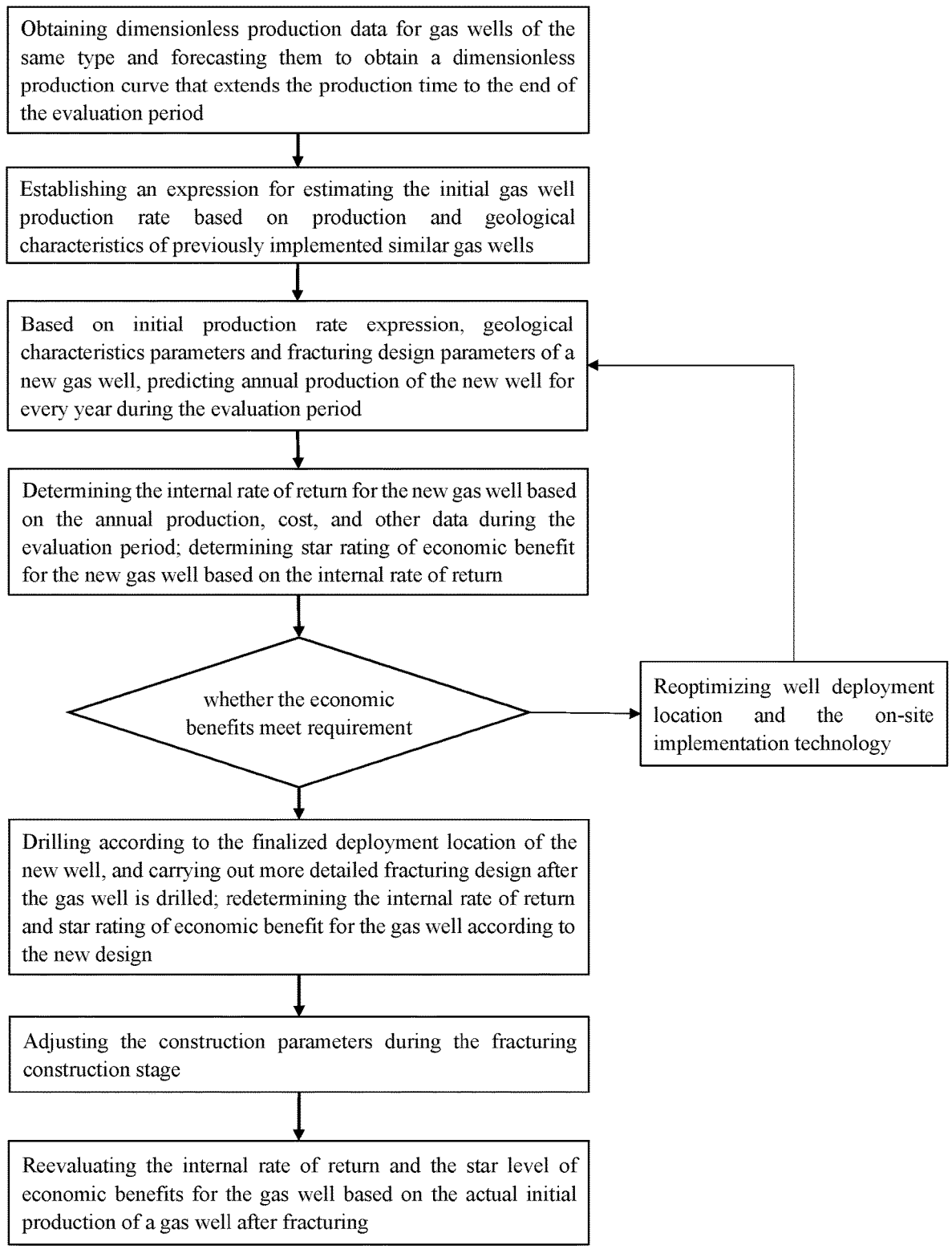
FIG. 1 is a flow chart of a management method for deployment and implementation of gas field development wells according to the present invention.

Referring to the drawings, the present invention will be further illustrated.

Embodiment

First, the present invention establishes the initial production rate expression of the gas well and the dimensionless production curve by using the dynamic production data of the previously implemented similar gas wells; then uses the above results to determine the annual production of the new well during the evaluation period, and determines the internal rate of return of the new gas well based on production and costs with the cash flow method. If the internal rate of return fails to meet the requirement, the deployment location and construction technology of the new well are re-optimized until the economic benefit requirements is satisfied. Corresponding star ratings are determined according to the internal rate of return of the gas wells. The new well is drilled according to the deployment location that can meet the economic benefit requirements. After the gas well is drilled, a more detailed fracturing design is carried out, and the internal rate of return of the gas well and the star rating of development benefit are redetermined according to the new design. During the fracturing stage, the construction parameters are optimized in real time. Finally, the internal rate of return and the star rating of the development benefit of the gas well are evaluated again based on the actual gas well initial production rate after fracturing. Specific implementation process of the method is shown in FIG. 1, and will be further described below.

1. Obtaining Dimensionless Production Data for Gas Wells of the Same Type and Forecasting them to Obtain a Dimensionless Production Curve that Extends the Production Time to the End of the Evaluation Period.

Based on the dynamic production data of previously implemented similar gas wells, the present invention obtains a dimensionless production curve through normalization processing, which reflects stable production and decreasing characteristics of the gas well, and takes initial production rate as a comparison object. Based on the normalized dimensionless production data, an ARPS method is used to extend the production time to the end of the evaluation period by predicting the change trend of dimensionless production curve.

The dimensionless production curve of the previously implemented similar gas wells is obtained by: using production start-up dates of each of the gas wells as starting points, using identical time measurement units (generally days or months), and providing production rate of the gas wells at different time points according to actual production data, namely providing the gas well production amount on the first day (or month), the second day (or month), the third day (or month), and up to the target cutoff time; using a shortest production time among the gas wells as a target cut-off time for normalization processing; using average production of each of the gas wells at different time points as normalized gas well production rate at a corresponding time point; and dividing the normalized gas well production rate at different time points by normalized gas well initial production rate (usually the average daily production rate within the first 30 days after production start-up or the monthly production amount of the first month), so as to obtain the dimensionless production curve of the previously implemented similar gas wells with the initial production rate as a comparison object.

2. Establishing an Expression for Estimating the Initial Gas Well Production Rate.

A relationship is established between initial production rate of gas well, and key geological characteristic parameters of gas formation as well as key fracturing parameters based on production and geological characteristics of previously implemented similar gas wells, which is called an expression for estimating the gas well initial production rate. The present invention uses a fitting method to determine the expression for estimating the gas well initial production rate:

$$Qsc = \sum_{i=1}^{Nsec} 0.1728 \times R_{di} \times L_{fi} \times H_{fi} \times \frac{k_i}{u_g}\left(\frac{P_r^2 - P_{wf}^2}{d_{fi}} - G_g \frac{P_r + P_{wf}}{2}\right)\frac{1}{ZT} \times \frac{Z_{sc} \times T_{sc}}{P_{sc}}$$

$$H_{fi} = b \times Q_{pi}^d \times V_{si}^n$$

$$L_{fi} = c \times Q_{pi}^t \times V_{si}^w$$

wherein 0.1728 is a dimensional conversion factor, $Q_{sc}$ indicates an estimated gas well initial production rate in m³/d; Nsec indicates the fractured segment numbers, which is dimensionless; $R_{di}$ indicates a drilling encounter rate of a gas formation at an ith fracture segment, which is dimensionless; $L_{fi}$ indicates a length of an ith fracture in m; $H_{fi}$ indicates a height of the ith fracture in m; $k_i$ indicates a reservoir permeability at the ith fracture in mD; $u_g$ indicates gas viscosity in mPa·s; $P_r$ indicates a formation pressure in MPa; $P_{wf}$ indicates a bottomhole flow pressure in MPa; $G_g$ indicates a gas seepage resistance gradient in MPa/m; $d_{fi}$ indicates a spacing between the ith fracture and fractures on both sides in m; $Q_{pi}$ indicates a fracturing displacement at the ith fracture in m³/min; $V_{si}$ indicates a sand addition amount at the ith fracture in m³; b, c, d, n, t and w are fitting parameters.

3. Determining Drilling and Production Investment as Well as Production and Operating Costs of the New Gas Well.

Based on drilling depth, fracturing design (comprising number of fractured layers, number of fractured segments, amount of sand added, amount of fracturing fluid, sand concentration and materials to be used in the gas wells) and surface conditions of gas wells, the present invention estimates development investment expense required to achieve normal production of the gas wells, which comprises drilling and production costs. The present invention also estimates the development cost in conjunction with data such as development and operating costs of the previously implemented similar gas wells.

4. Forecasting Production Rate of the New Gas Well.

Based on key geological characteristics parameters and key fracturing design parameters of a new gas well, initial production rate of the new gas well is estimated by using the expression for estimating the gas well initial production rate obtained in the step 2; and then annual production of the new well for every year during the evaluation period is predicted according to the dimensionless production curve obtained in the step 1.

5. Estimating Internal Rate of Return for the New Gas Well.

The internal rate of return of the new gas well is determined with a cash flow method based on the development and operating costs of the new gas well obtained in step 3, the annual production of the new gas well during the evaluation period obtained in step 4, and gas prices.

The annual production during the evaluation period is multiplied by the gas prices to show cash inflow for each year, and annual cost is subtracted from the cash inflow for each year to show net cash flow for each year. Based on the net cash flow for each year during the evaluation period, the internal rate of return can be calculated.

6. Determining Star Rating of Development Benefit for the New Gas Well Based on the Internal Rate of Return.

In order to achieve a more refined management of the gas wells, the present invention hierarchically evaluates the internal rate of return and divides it into different levels according to the rate of return. In order to show the different levels more visually, a star level division method is used in the present embodiment to divide the development benefits into different star ratings. For example, the rate of return is divided into five star ratings from small to large, wherein the one-star corresponds to the smallest rate of return and the five-star corresponds to the largest rate of return. The internal rate of return for a three-star gas well must be no less than a bottom limit of the internal rate of return specified by the industry (generally 8%). A starting point of the internal rate of return for a four-star gas well should be higher than that of the three-star gas well, and a starting point of the internal rate of return for the five-star gas well should be higher than that of the four-star gas well. The specific values can be determined according to actual situations, and it is generally recommended that starting points of internal rate of return for two adjacent star ratings differs by 2% or above. The present invention performs star rating for the new gas well based on the above star classification.

7. Determining Whether the New Gas Well Meets the Economic Benefit Requirements, and if not, Re-Optimizing Well Deployment Locations and Engineering Process Technologies Such as Drilling and Fracturing.

If the star rating of the new gas well fails to meet the economic benefit requirement, the deployment location as well as drilling and fracturing processes of the new gas well must be optimized, and then the steps 3-6 is repeated to iteratively optimize the well deployment location and the engineering process technologies until the star rating of the new gas well meets the requirement. In this embodiment, gas wells that can meet the economic benefit requirements (gas wells with internal rate of return greater than or equal to 8%) are designated as three-star gas wells.

8. Further Optimizing Gas Well Fracturing Design after the New Gas Well is Drilled.

After the gas well is drilled, in order to improve the targeting of fracturing design, carrying out a layer-by-layer and section-by-section fracturing optimization design by integration of geology and engineering based on the geological characteristic parameters obtained from actual drilling.

9. Performing Star Rating Again for the Gas Well after Fracturing Re-Optimization.

Based on the new fracturing optimization design in the step 8, the steps 3-6 are repeated to re-analyze and determine the star rating of economic benefit for the gas well.

10. Real-Time Adjusting Construction Parameters During Fracturing Stage.

During the fracturing stage, the present invention timely optimizes and adjusts construction parameters such as fracturing displacement, sand concentration, amount of sand added and amount of fracturing fluid according to the actual construction conditions on site, thereby obtaining better implementation results.

11. Performing Star Rating Again for the Gas Well Based on the Actual Initial Production Rate after Fracturing.

Based on the actual initial production rate after fracturing, the dimensionless production curve in the step 1, the actual drilling and production investment, and the production and operating costs, the steps 5-6 are repeated to analyze and determine the star rating of economic benefit for the gas well again.

In order to demonstrate the feasibility of the present invention, the above method is applied to an actual gas field as described below, wherein a development horizontal well in 2021 in the Upper Paleozoic S2 gas reservoir of a gas field is selected as the embodiment of the present invention. The specific implementation process is as follows.

Figure 2:
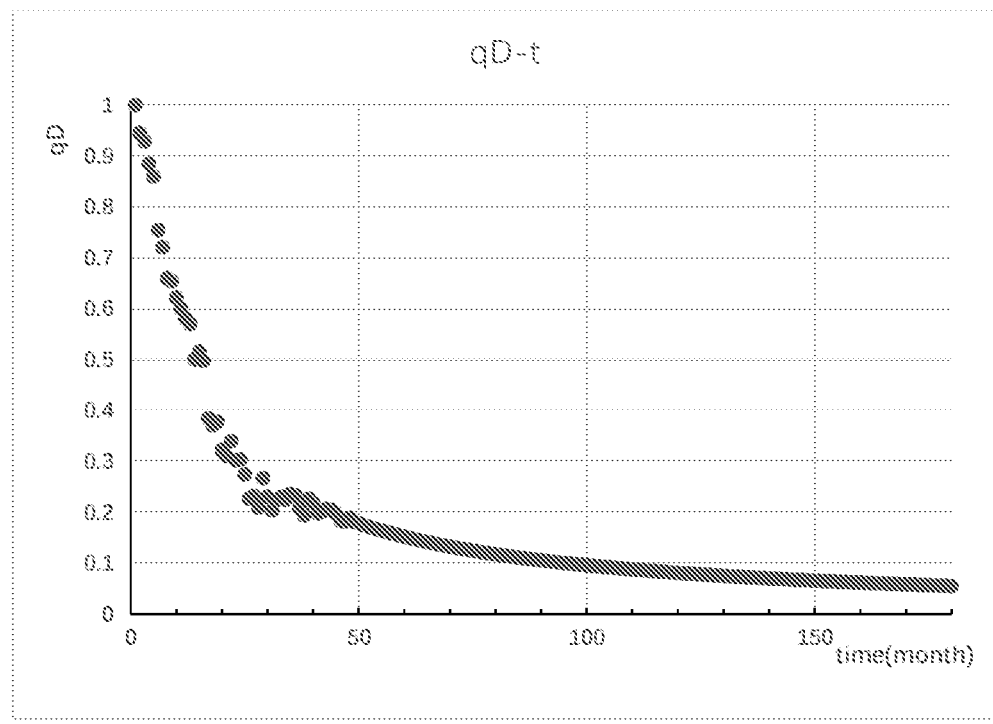
FIG. 2 illustrates a dimensionless production curve established in an embodiment of the present invention.

(1) Based on the dynamic production data of four previously implemented similar gas wells, including DPH-58, DPS-74 and DPH-124 wells in the S2 gas reservoir in adjacent well areas, obtaining a dimensionless production curve of the previously implemented similar gas wells (FIG. 2) and dimensionless production rate tables (Tables 1 and 2, wherein Table 1 shows normalized monthly production rate and dimensionless monthly production rate data, and Table 2 shows dimensionless monthly production rate data of which the production time is forecasted to the end of the evaluation period) through normalization and Arps decreasing fit, which reflects stable production and decreasing characteristics of the gas well, and takes initial production rate as a comparison object.

TABLE 1

| Production time starting from the production start-up date (month) | Production rate (10⁴m³/month) | Dimensionless monthly production rate |
|---|---|---|
| 1 | 161.00 | 1.0000 |
| 2 | 152.28 | 0.9458 |
| 3 | 149.52 | 0.9287 |
| 4 | 142.37 | 0.8843 |
| 5 | 138.40 | 0.8596 |
| ... | ... | ... |
| 50 | 30.363475 | 0.1886 |

TABLE 2

| Production time starting from the production start-up date (month) | Dimensionless production rate |
|---|---|
| 1 | 1 |
| 2 | 0.945794774 |
| 3 | 0.928707506 |
| ... | ... |
| 178 | 0.05560490 |
| 179 | 0.055307812 |
| 180 | 0.055013882 |

(2) Fitting an expression for estimating the gas well initial production rate based on production data and geological characteristics of the four previously implemented similar gas wells, including DPH-58, DPS-74 and DPH-124:

$$Q_{sc} = \sum_{i=1}^{N_{sec}} 0.1728 \times R_{di} \times L_{fi} \times H_{fi} \times \frac{k_i}{u_g} \left( \frac{P_r^2 - P_{wf}^2}{d_{fi}} - G_g \frac{P_r + P_{wf}}{2} \right) \frac{1}{ZT} \times \frac{Z_{sc} \times T_{sc}}{P_{sc}}$$

$$H_{fi} = 0.9247 \times Q_{pi}^{0.536} \times V_{si}^{0.447}$$

$$L_{fi} = 44.848 \times Q_{pi}^{0.0268} \times V_{si}^{0.3862}$$

wherein Nsec indicates the fractured segment numbers, which is dimensionless; $R_{di}$ indicates a drilling encounter rate of a gas formation at an ith fracture segment, which is decimal; $L_{fi}$ indicates a length of an ith fracture in m; $H_{fi}$ indicates a height of the ith fracture in m; $k_i$ indicates a reservoir permeability at the ith fracture in mD; $u_g$ indicates gas viscosity in mPa·s; $P_r$ indicates a formation pressure in MPa; $P_{wf}$ indicates a bottomhole flow pressure in MPa; $G_g$ indicates a gas seepage resistance gradient in MPa/m, which can be determined according to the reservoir permeability $k_i$ at the ith fracture. According to experimental data, a relationship between permeability and seepage resistance gradient is $G_g=0.0113k_i^{-0.728}$; $d_{fi}$ indicates a spacing between the ith fracture and fractures on both sides in m; $Q_{pi}$ indicates a fracturing displacement at the ith fracture in m³/min; $V_{si}$ indicates a sand addition amount at the ith fracture in m³.

(3) According to a drilling depth of the gas well, fracturing design conditions (comprising number of fractured layers, number of fractured segments, amount of sand added, amount of fracturing fluid, sand concentrations and materials to be used in the gas wells) based on geological characteristics of the gas formation at the deployment location of the well, and ground conditions, estimating development cost required to achieve normal gas well production, which was RMB 18 million including drilling and production costs.

Figure 3:
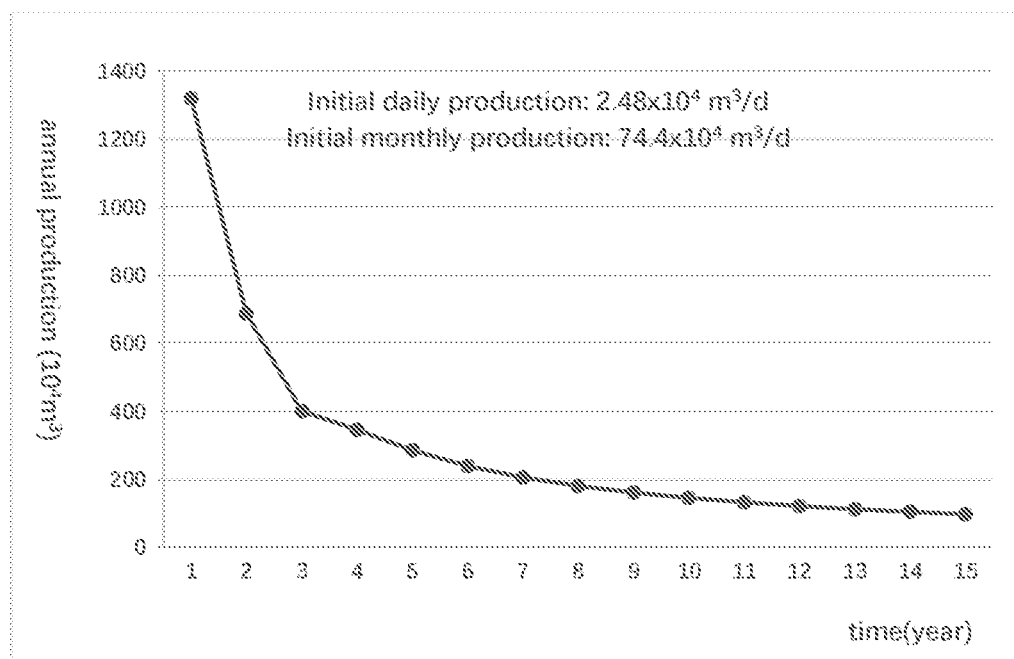
FIG. 3 illustrates an annual production variation of a gas well during an evaluation period according to the embodiment of the present invention.

4) Based on the key geological parameters such as the horizontal section length of 1000 m, the predicted average gas formation thickness of 6.5 m, the average sand thickness of 13 m, and the average permeability of 0.2 mD, as well as the key fracturing design parameters such as 7 fracturing segments, the fracturing displacement of 4 m³/min, the sand addition amount of 35 m³ for single fractured segment, the fracture half-length of 183.73 m, and the fracture height of 9.52 m of the new well, estimating the initial production rate of the new gas well with the expression for estimating the initial production rate obtained in the step 2), which was 24,800 m³/d (744,000 m³/month); then predicting an annual production variation of the gas well during the evaluation period (FIG. 3) in conjunction with the dimensionless production curve obtained in the step 1).

5) Based on the new well cost obtained in the step 3), the predicted annual gas well production during the evaluation period obtained in the step 4), the gas price of RMB 1.119/m³ at that time, and the natural gas operating cost of RMB 0.135/m³ for the similar gas wells, calculating the internal rate of return of the well, which was −5.1%.

6) Defining that the internal rate of return of a three-star gas well should be greater than or equal to 8% and less than 10% since the current bottom limit of internal rate of return in the natural gas development industry is generally 8%; and defining that the internal rate of return of a four-star gas well should be greater than or equal to 10% and less than 12%, and the internal rate of return of a five-star gas well should be greater than or equal to 12%; wherein according to the above-mentioned star rating rules, this well had no economic benefits with a star rating lower than three stars.

7) Re-optimizing the deployment location and fracturing process parameters since the star rating of the gas well fails to meet economic benefit requirements, wherein after optimization, the new gas well had a horizontal section length of about 1300 m, an average gas formation thickness of 8 m, an average sand thickness of 15 m, an average permeability of 0.11 mD; 15 fracturing segments, a fracturing displacement of 7.5 m$^3$/min, the sand addition amount of 60 m$^3$ for single fractured segment, and a total investment of about RMB 24.5 million; estimating the initial production rate of the new gas well with the expression for estimating the initial production rate obtained in the step 2), which was 47,800 m$^3$/d (1,434,000 m$^3$/month); after the above optimization, repeating the steps 3)-6) to evaluate pre-tax internal rate of return of the gas well, which was 15.4%, and evaluate post-tax internal rate of return, which was 10.5%, which means the gas well was a four-star gas well and met the economic benefit requirements.

8) After the gas well is drilled, in order to improve the targeting of fracturing design, carrying out a layer-by-layer and section-by-section fracturing optimization design by integration of geology and engineering based on the geological characteristics parameters obtained from actual drilling, wherein specific fracturing design parameters are shown in Table 3, and a total investment was about RMB 24.6 million; according to the expression for estimating the gas well initial production rate obtained in the step 2), the initial production rate of the new gas well was 48,000 m$^3$/d (1,440,000 m$^3$/month).

TABLE 3

| Fracturing segment | Sand thickness (m) | Gas thickness (m) | Gas formation drilling encounter rate (decimal) | Design Fracturing displacement (m$^3$/min) | Design amount of sand added (m$^3$) | Design sand concentration (%) |
|---|---|---|---|---|---|---|
| 1 | 13 | 8.60 | 0.6100 | 8 | 60.6 | 24.2 |
| 2 | 12.8 | 7.50 | 0.5230 | 8 | 70.8 | 24.2 |
| 3 | 12.6 | 7.20 | 0.5600 | 8 | 80.3 | 24.2 |
| 4 | 12.4 | 8.10 | 0.4800 | 8 | 75.5 | 24.2 |
| 5 | 12.1 | 6.50 | 0.4300 | 8 | 75.9 | 24.2 |
| 6 | 11.9 | 7.50 | 0.5100 | 8 | 74.6 | 24.1 |
| 7 | 11.7 | 6.40 | 0.5500 | 8 | 80.3 | 24.2 |
| 8 | 11.5 | 5.60 | 0.5300 | 8 | 75.1 | 24.1 |
| 9 | 11.3 | 5.80 | 0.5000 | 8 | 75.1 | 24.1 |
| 10 | 11.1 | 7.80 | 0.4900 | 8 | 52.9 | 24.2 |
| 11 | 10.9 | 6.30 | 0.5700 | 8 | 52.9 | 24.2 |
| 12 | 10.6 | 7.80 | 0.6700 | 8 | 60.6 | 24.2 |
| 13 | 10.4 | 6.10 | 0.6800 | 8 | 50.6 | 24.1 |
| 14 | 10.2 | 5.70 | 0.5100 | 8 | 65.9 | 24.3 |
| 15 | 10 | 6.80 | 0.5200 | 8 | 65.9 | 24.3 |
| Total | | | | | 1017 | |

9) Based on the new fracturing design in the step 8), repeating the steps 3)-6) to evaluate, wherein the pre-tax internal rate of return was 15.700, the after-tax internal rate of return was 10.7%, and the gas well was a four-star gas well.

10) During fracturing, in order to guarantee the implementation effect, timely optimizing and adjusting the construction parameters such as fracturing displacement, sand concentration, and amount of sand added were optimized and adjusted according to the actual construction conditions on site, wherein comparison between the actual construction parameters and the design parameters is shown in Table 4.

TABLE 4

| Fracturing segment | Design fracturing displacement (m$^3$/min) | Design amount of sand added (m$^3$) | Design sand concentration (%) | Actual fracturing displacement (m$^3$/min) | Actual amount of sand added (m$^3$) | Actual sand concentration (%) |
|---|---|---|---|---|---|---|
| 1 | 8 | 60.6 | 24.2 | 7.9 | 61.6 | 24.1 |
| 2 | 8 | 70.8 | 24.2 | 8.1 | 72.3 | 24.6 |
| 3 | 8 | 80.3 | 24.2 | 8.2 | 81.3 | 24.4 |
| 4 | 8 | 75.5 | 24.2 | 7.8 | 76.5 | 23.9 |
| 5 | 8 | 75.9 | 24.2 | 8.2 | 76.9 | 24.6 |
| 6 | 8 | 74.6 | 24.1 | 8.1 | 75.6 | 24 |
| 7 | 8 | 80.3 | 24.2 | 8.0 | 81.3 | 24.1 |

TABLE 4-continued

| Fracturing segment | Design fracturing displacement (m³/min) | Design amount of sand added (m³) | Design sand concentration (%) | Actual fracturing displacement (m³/min) | Actual amount of sand added (m³) | Actual sand concentration (%) |
|---|---|---|---|---|---|---|
| 8 | 8 | 75.1 | 24.1 | 7.9 | 76.1 | 23.6 |
| 9 | 8 | 75.1 | 24.1 | 8.3 | 76.1 | 24.7 |
| 10 | 8 | 52.9 | 24.2 | 8.0 | 53.9 | 24.8 |
| 11 | 8 | 52.9 | 24.2 | 8.1 | 53.9 | 24.3 |
| 12 | 8 | 60.6 | 24.2 | 7.9 | 63.6 | 23.8 |
| 13 | 8 | 50.6 | 24.1 | 8.2 | 51.6 | 26.4 |
| 14 | 8 | 65.9 | 24.3 | 8.1 | 66.9 | 25 |
| 15 | 8 | 65.9 | 24.3 | 8.0 | 67.4 | 25 |
| Total |  | 1017 |  |  | 1035 |  |

11) based on the actual gas well initial production rate after fracturing of 49,700 m³/d (1,491,000 m³/month), the dimensionless production curve in the step 1), and the actual drilling and production costs of RMB 24.8 million, repeating the steps 5)-6) to analyze and determine the pre-tax internal rate of return of the gas well, which was 17.7%, and the post-tax internal rate of return, which was 12.0%; wherein the star rating of the gas well was five stars.

From the above analysis, it can be seen that adopting the star rating management method during the deployment and implementation of the gas wells helps to iteratively optimize and enhance the well deployment demonstration and construction design, thus safeguarding the development benefit of gas wells.

System Embodiment

The present invention also provides a star rating management system for deployment and implementation of gas field development wells, comprising a processor and a memory, wherein the processor executes a computer program stored in the memory to implement the star rating management method for deployment and implementation of the gas field development wells of the above embodiment. That is to say, the deployment and implementation process of gas field development wells in the above embodiment can be implemented by computer program instructions. These computer program instructions can be provided to a processor such that the processor executes these instructions to realize the functions specified for the above method.

According to the system embodiment, the processor is a processing device such as a microprocessor MCU or programmable logic device FPGA; the memory comprises physical devices for storing information, which usually digitizes information and then stores the information in media using electrical, magnetic or optical means. For example, there are various types of memories that use electrical energy to store information, such as RAM and ROM; various types of memories that use magnetic energy to store information, such as hard disk, floppy disk, magnetic tape, magnetic core memory, magnetic bubble memory and USB flash drive; various types of memories that use optical means to store information, such as CD and DVD. Of course, there are other types of memories, such as quantum memory and graphene memory.

A device formed by the above-mentioned memory, processor and computer programs, through which the processor executes the corresponding program instructions to achieve relevant functions. The processor can carry a variety of operating systems, such as windows operating system, linux system, android and iOS system.

As another embodiment, the device further comprises a display, which is used to display diagnostic results for reference by staff.

The above embodiments are preferred embodiments of the present invention, but implementation of the present invention is not limited by the above embodiments. Any other changes not deviating from the present invention shall be equivalent substitutions and are included in the protection scope of the present invention.

What is claimed is:

1. A star rating management method for deployment and implementation of gas field development wells, comprising steps of:
   1) obtaining dynamic production data of previously implemented similar gas wells, and normalizing the dynamic production data to obtain a dimensionless production curve; forecasting change trend of the dimensionless production curve for extending a production time of the dimensionless production curve to an end of an evaluation period, so as to obtain a dimensionless production curve of the evaluation period;
   2) establishing a relationship between initial production rate of gas well and key geological characteristic parameters of gas formation as well as key fracturing parameters based on production and geological characteristics of similar gas wells implemented previously, and using the relationship as an expression for estimating the gas well initial production rate;
   3) based on drilling depth, fracturing design and surface conditions of gas wells, estimating development investment cost required to achieve normal production of the gas wells, which comprises drilling and production costs; wherein the fracturing design comprises number of fractured layers, number of fractured segments, amount of sand added, amount of fracturing fluid, sand concentration and materials to be used in the gas wells;
   4) based on key geological characteristics parameters and key fracturing design parameters of a new gas well, estimating initial production of the new gas well by using the expression for estimating the gas well initial production rate obtained in the step 2); and then predicting annual production of the new well during the evaluation period according to the dimensionless production curve obtained in the step 1);
   5) based on the development investment cost of the new well obtained in the step 3), production forecast of the new well during the evaluation period obtained in the step 4), gas prices, as well as development and operating cost data of the previously implemented similar gas wells, calculating an internal rate of return of the new well with a cash flow method;

6) the internal rate of return of the new gas well fails to meet economic benefit requirements, optimizing a horizontal section length, an average gas formation thickness, an average sand thickness, an average permeability, the number of fracturing segments, a fracturing displacement, and a sand addition amount for single fractured segment of the new gas well, and then repeating the steps 3)-5) until the internal rate of return of the new gas well meets the economic benefit requirements;

(7) after the internal rate of return meets the economic benefit requirements, drilling the new well at a corresponding deployment location, and then performing fracturing optimization again based on geological feature parameters obtained from actual drilling data; and 8) Based on the reoptimized fracturing design, repeating the steps 3)-5) to redetermine the internal rate of return of the new gas well;

9) During a fracturing implementation stage of the new gas well, timely optimizing and adjusting construction parameters such as the fracturing displacement, the sand concentration, the amount of sand added and amount of fracturing fluid according to actual construction conditions on site;

10) Redetermining the internal rate of return of the new gas well based on actual initial production rate of the new gas well after fracturing;

11) Hierarchically evaluating development benefit of the gas wells according to the internal rate of return, wherein the internal rate of return is divided into a number of star ratings from small to large, and corresponding star ratings are determined according to the internal rate of return of the gas wells.

2. The star rating management method, as recited in claim 1, wherein the economic benefit requirements in the step 6) refers to a bottom limit of the internal rate of return for benefit development.

3. The star rating management method, as recited in claim 1, wherein starting points of internal rate of return for two adjacent star ratings differ by 2%.

4. The star rating management method, as recited in claim 1, wherein in the step 1), an ARPS method is used for forecasting the dimensionless production curve.

5. The star rating management method, as recited in claim 1, wherein in the step 1), the dimensionless production curve is determined as follows:

A: obtaining the dynamic production data of the previously implemented similar gas wells which are of a same type of the new gas well; using production start-up dates of each of the gas wells as starting points, using identical time measurement units, and providing production rates of the gas wells at different time points according to actual production data; using a shortest production time among the gas wells as a target cut-off time for normalization;

B: using average production of each of the gas wells at different time points as normalized gas well production at a corresponding time point; and C: dividing the normalized gas well production rate at different time points by normalized gas well initial production rate, so as to obtain the dimensionless production curve with the initial production rate as a comparison object.

6. The star rating management method, as recited in claim 1, wherein in the step 2), the expression for estimating the gas well initial production is:

$$Qsc = \sum_{i=1}^{Nsec} 0.1728 \times R_{di} \times L_{fi} \times H_{fi} \times \frac{k_i}{u_g}\left(\frac{P_r^2 - P_{wf}^2}{d_{fi}} - G_g \frac{P_r + P_{wf}}{2}\right)\frac{1}{ZT} \times \frac{Z_{sc} \times T_{sc}}{P_{sc}}$$

$$H_{fi} = b \times Q_{pi}^d \times V_{si}^n$$

$$L_{fi} = c \times Q_{pi}^t \times V_{si}^w$$

wherein 0.1728 is a dimensional conversion factor, $Q_{sc}$ indicates an estimated gas well initial production rate in m³/d; Nsec indicates the fractured segment numbers, which is dimensionless; $R_{di}$ indicates a drilling encounter rate of a gas formation at an ith fracture segment, which is dimensionless; $L_{fi}$ indicates a length of an ith fracture in m; $H_{fi}$ indicates a height of the ith fracture in m; $k_i$ indicates a reservoir permeability at the ith fracture in mD; $u_g$ indicates gas viscosity in mPa·s; $P_r$ indicates a formation pressure in MPa; $P_{wf}$ indicates a bottomhole flow pressure in MPa; $G_g$ indicates a gas seepage resistance gradient in MPa/m; $d_{fi}$ indicates a spacing between the ith fracture and fractures on both sides in m; $Q_{pi}$ indicates a fracturing displacement at the ith fracture in m³/min; $V_{si}$ indicates a sand addition amount at the ith fracture in m³; b, c, d, n, t and w are fitting parameters.

* * * * *